US012760500B2

(12) United States Patent
Fujita et al.

(10) Patent No.: US 12,760,500 B2
(45) Date of Patent: Oct. 13, 2026

(54) HYDRAULIC DRIVE DEVICE

(71) Applicant: KOBELCO CONSTRUCTION MACHINERY CO., LTD., Hiroshima (JP)

(72) Inventors: Yuichiro Fujita, Hiroshima (JP); Hiromitsu Koura, Hiroshima (JP); Koji Ueda, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 19/100,019

(22) PCT Filed: Aug. 7, 2023

(86) PCT No.: PCT/JP2023/028730
§ 371 (c)(1),
(2) Date: Jan. 30, 2025

(87) PCT Pub. No.: WO2024/043052
PCT Pub. Date: Feb. 29, 2024

(65) Prior Publication Data

US 2026/0035883 A1 Feb. 5, 2026

(30) Foreign Application Priority Data

Aug. 23, 2022 (JP) ............................ JP2022-132318

(51) Int. Cl.
*E02F 9/22* (2006.01)
*F15B 21/08* (2006.01)

(52) U.S. Cl.
CPC .......... *E02F 9/2203* (2013.01); *E02F 9/2296* (2013.01); *F15B 21/087* (2013.01); (Continued)

(58) Field of Classification Search
CPC ....................... F15B 21/087; F15B 2211/6346
See application file for complete search history.

(56) References Cited

U.S. PATENT DOCUMENTS 5,170,625 A * 12/1992 Watanabe ............ F15B 11/165 91/511
5,967,756 A 10/1999 Devier et al.
(Continued)

FOREIGN PATENT DOCUMENTS

EP 0 440 802 A1 8/1991
JP 11-72088 A 3/1999
(Continued)

OTHER PUBLICATIONS

Extended European Search Report issued Aug. 28, 2025 in European Patent Application No. 23857166.5, 7 pages.
(Continued)

*Primary Examiner* — Thomas E Lazo
(74) *Attorney, Agent, or Firm* — Oblon, McClelland, Maier & Neustadt, L.L.P.

(57) ABSTRACT

A hydraulic driving system includes a pump, an actuator, and a controller. The pump is rotationally driven by a power source to discharge oil. The pump has a capacity which is changeable. The actuator is activated by a supply of the oil discharged from the pump. The controller controls the capacity of the pump in accordance with a manipulation content for the actuator. The controller changes, on the basis of a rotational speed of the pump, an upper limit value of a magnitude of a pump capacity change amount being a change amount of the capacity of the pump per unit time.

2 Claims, 8 Drawing Sheets

(52) U.S. Cl.
CPC .......... *E02F 9/2285* (2013.01); *E02F 9/2292* (2013.01); *F15B 2211/6346* (2013.01)

(56) References Cited

U.S. PATENT DOCUMENTS

| | | | | |
|---|---|---|---|---|
| 2012/0247094 | A1* | 10/2012 | Koga | E02F 9/2235 60/420 |
| 2013/0318971 | A1* | 12/2013 | Sora | F04B 49/08 60/431 |
| 2016/0265195 | A1* | 9/2016 | Imura | E02F 9/2075 |
| 2021/0404141 | A1* | 12/2021 | Sano | E02F 9/2296 |

FOREIGN PATENT DOCUMENTS

| | | | |
|---|---|---|---|
| JP | 2005-139658 | A | 6/2005 |
| WO | WO 2020/184606 | A1 | 9/2020 |

OTHER PUBLICATIONS

International Search Report issued Oct. 17, 2023 in PCT Application No. PCT/JP2023/028730 filed Aug. 7, 2023, 2 pages.

* cited by examiner

HYDRAULIC DRIVE DEVICE

TECHNICAL FIELD

The present invention relates to a hydraulic driving system including an actuator and a pump that supplies oil to the actuator.

BACKGROUND ART

For instance, Patent Literature 1 describes a technology related to a conventional pump. The technology described in the Literature shows a gradual increase in an increase degree of a flow rate of oil to be supplied from the pump to an actuator (a hydraulic cylinder in the Literature) at activation of the actuator. This leads to a shock reduction and preferable acceleration at the activation of the actuator (see "ABSTRACT" of the Literature).

Such a flow rate of oil to be supplied from a pump to an actuator changes on the basis of a rotational speed of the pump. However, the invention described in the Literature fails to consider the rotational speed of the pump. The lack of consideration may result in a failure at appropriately providing the shock reduction effect at the activation of the actuator and the effect of exerting the acceleration of the actuator depending on the rotational speed of the pump. Besides, a disadvantage attributed to a sudden change in the flow rate of the oil to be supplied from the pump to the actuator may be suffered as well as the shock at the activation of the actuator.

CITATION LIST

Patent Literature

Patent Literature 1: Japanese Unexamined Patent Publication No. 2005-139658

Summary of Invention

From the perspective described above, the present invention has an object of providing a hydraulic driving system that enables setting a flow rate of oil to be supplied from a pump to an actuator to an appropriate value on the basis of a rotational speed of the pump.

A hydraulic driving system includes: a pump; an actuator; and a controller. The pump is rotationally driven by a power source to discharge oil. The pump has a capacity which is changeable. The actuator is activated by a supply of the oil discharged from the pump. The controller controls the capacity of the pump in accordance with a manipulation content for the actuator. The controller changes, on the basis of a rotational speed of the pump, an upper limit value of a magnitude of a pump capacity change amount being a change amount of the capacity of the pump per unit time.

This configuration enables setting of the flow rate of the oil to be supplied from the pump to the actuator to an appropriate value on the basis of the rotational speed of the pump.

DESCRIPTION OF EMBODIMENTS

Figure 1:
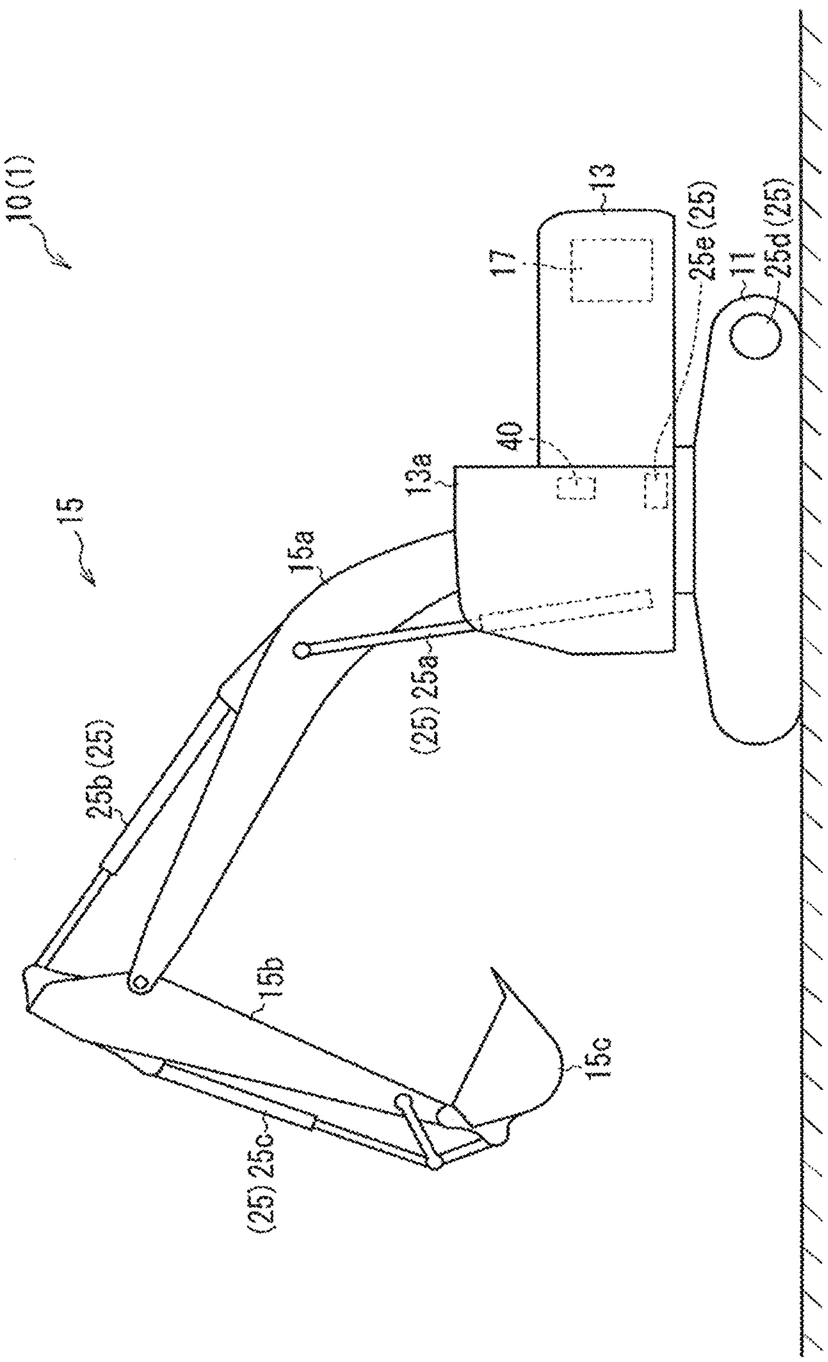
FIG. 1 is a side view of a working machine.

A hydraulic driving system 1 according to an embodiment will be described with reference to FIG. 1 to FIG. 8.

The hydraulic driving system 1 is configured to set a flow rate of oil to be supplied from a pump to an actuator to an appropriate value based on a rotational speed of the pump. The hydraulic driving system 1 includes a working machine 10 illustrated in FIG. 1, and a manipulation part 31, a manipulation amount detector 33, and a controller 40 each shown in FIG. 2.

As illustrated in FIG. 1, the working machine 10 performs a work, for example, is a construction machine that performs a construction work, e.g., an excavator or a crane. Hereinafter, the working machine 10 is mainly described as the excavator. The working machine 10 may be manipulated by an operator in an operating compartment 13*a*, may be remotely manipulated by an operator located outside the working machine 10, e.g., an operator at a remote location apart from the working machine 10, or may be manipulated through autonomous driving. The working machine 10 includes a lower traveling body 11, an upper slewing body 13, an attachment 15, a power source 17, and a hydraulic circuit 20 (see FIG. 2).

The lower traveling body 11 is configured to travel on a traveling surface, such as the ground. The lower traveling body 11 may include a crawler, or include a wheel.

The upper slewing body 13 is slewably mounted on the lower traveling body 11. Specifically, the upper slewing body 13 is mounted on the lower traveling body 11 rotatably about a rotation axis extending in an up-down direction. The upper slewing body 13 includes the operating compartment 13*a*. The operating compartment 13*a* is a portion (manipulation chamber) for allowing the operator to manipulate the working machine 10.

The attachment 15 executes a work, and has, for example, a boom 15*a*, an arm 15*b*, and a leading end attachment 15*c*. The boom 15*a* is attached to the upper slewing body 13 in a tiltable manner, that is, rotatably in the up-down direction. The arm 15*b* is rotatably attached to the boom 15*a*. The leading end attachment 15*c* is provided on a leading end of the attachment 15 and rotatably attached to the arm 15*b*. The leading end attachment 15*c* may be, for example, a bucket to excavate and scoop a work target, a device (such as a grapple and a nibbler) to sandwich the work target, or a device (such as a breaker) that crushes and demolishes the work target.

The power source 17 drives a pump 21. The power source 17 is mounted to the working machine 10, specifically, mounted to the upper slewing body 13. The power source 17 may include an internal combustion (engine) or an electric motor. The power source 17 shown in FIG. 2 has a rotational speed which is changeable, more specifically, an output shaft 17*a* has a rotational speed which is changeable. The rotational speed of the power source 17 may be changed in response to a manipulation by the operator, or may be controlled in accordance with an instruction from the controller 40. The power source 17 includes the output shaft 17*a*. The output shaft 17*a* is a shaft member that is rotationally driven by the power source 17.

The hydraulic circuit 20 is configured to regulate an actuator 25. The hydraulic circuit 20 is mounted to the working machine 10, specifically, mounted to the upper slewing body 13. The hydraulic circuit 20 includes the pump 21, a pump capacity regulator 23, the actuator 25, and a control valve 27.

The pump 21 is a hydraulic pump rotationally driven by the power source 17 to discharge oil or hydraulic fluid. The pump 21 is rotationally driven by the power source 17 to suck the oil from a tank and discharge the oil. The hydraulic circuit 20 may include only one pump 21, or may inlucde a plurality of pumps 21. The pump 21 is connected to the output shaft 17*a* of the power source 17. Specifically, for instance, the pump 21 has an input shaft connected to the output shaft 17*a* of the power source 17. The pump 21 may be directly connected to the output shaft 17*a*. A pump rotational speed N being a rotational speed of the pump 21 may be equal to a rotational speed of the output shaft 17*a* of the power source 17. The pump 21 may be connected to the output shaft 17*a* via a transmission (a decelerator or an accelerator). When a speed ratio (a reduction ratio or an increase ratio) of the transmission is constant, the pump rotational speed N may be proportional to the rotational speed of the power source 17.

Figure 4:
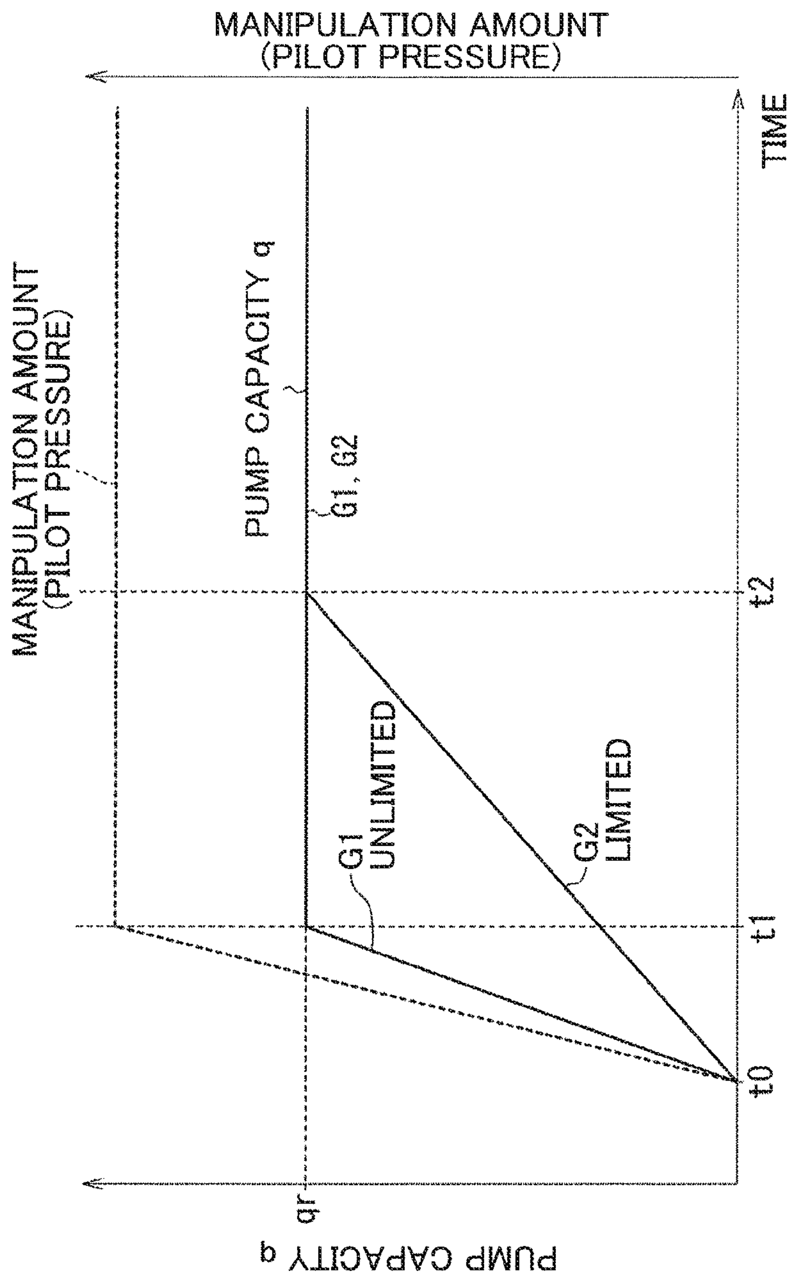
FIG. 4 includes graphs respectively showing a change over a period of time in the manipulation amount about the manipulation part and a change over a period of time in a pump capacity of the pump.

The pump 21 has a capacity, i.e., a pump capacity q, which is changeable. In other words, the pump 21 is a variable displacement hydraulic pump. The pump capacity q may be changed, for example, as shown in FIG. 4, but such a change tendency in the pump capacity q is not limited to the specific example shown in FIG. 4. The pump capacity q corresponds to a flow rate of the oil discharged from the pump 21 at one rotation of the input shaft of the pump 21. Specifically, for instance, the pump capacity q (tilt amount) changes depending on a change in a tilt angle of a swash plate (not shown) relative to the input shaft of the pump 21.

The pump capacity regulator 23 (regulator) regulates the pump capacity q. The pump capacity regulator 23 regulates the pump capacity q in accordance with a pump capacity instruction input into the pump capacity regulator 23. The pump capacity instruction may be, for example, an electric signal output from the controller 40, or, specifically, may be, for example, an electric current value. Hereinafter, the electric current value is referred to as a pump capacity instruction electric current or tilt angle instruction electric current as well. The pump capacity regulator 23 may be configured to change the pump capacity q in accordance with a pump capacity instruction indicated by the electric signal. Specifically, the pump capacity regulator 23 may be configured to change the pump capacity q without conversion of the electric signal. Alternatively, the pump capacity regulator 23 may be configured to convert an electric signal indicating the pump capacity instruction into a pilot pressure or hydraulic pressure and change the pump capacity q on the basis of the pilot pressure. A specific example of the conversion from the electric signal into the pilot pressure by the pump capacity regulator 23 will be described below. In this case, the pump capacity regulator 23 includes a pump capacity change valve 23*a* and a pump capacity changer 23*b*.

The pump capacity change valve 23*a* converts the input electric signal into the pilot pressure or hydraulic pressure. The pump capacity change valve 23*a* may be in the form of a proportional solenoid valve or other valve except the proportional solenoid valve.

The pump capacity changer 23*b* changes the pump capacity q (e.g., a tilt angle of the pump 21) on the basis of the pilot pressure output from the pump capacity change valve 23*a*.

Figure 2:
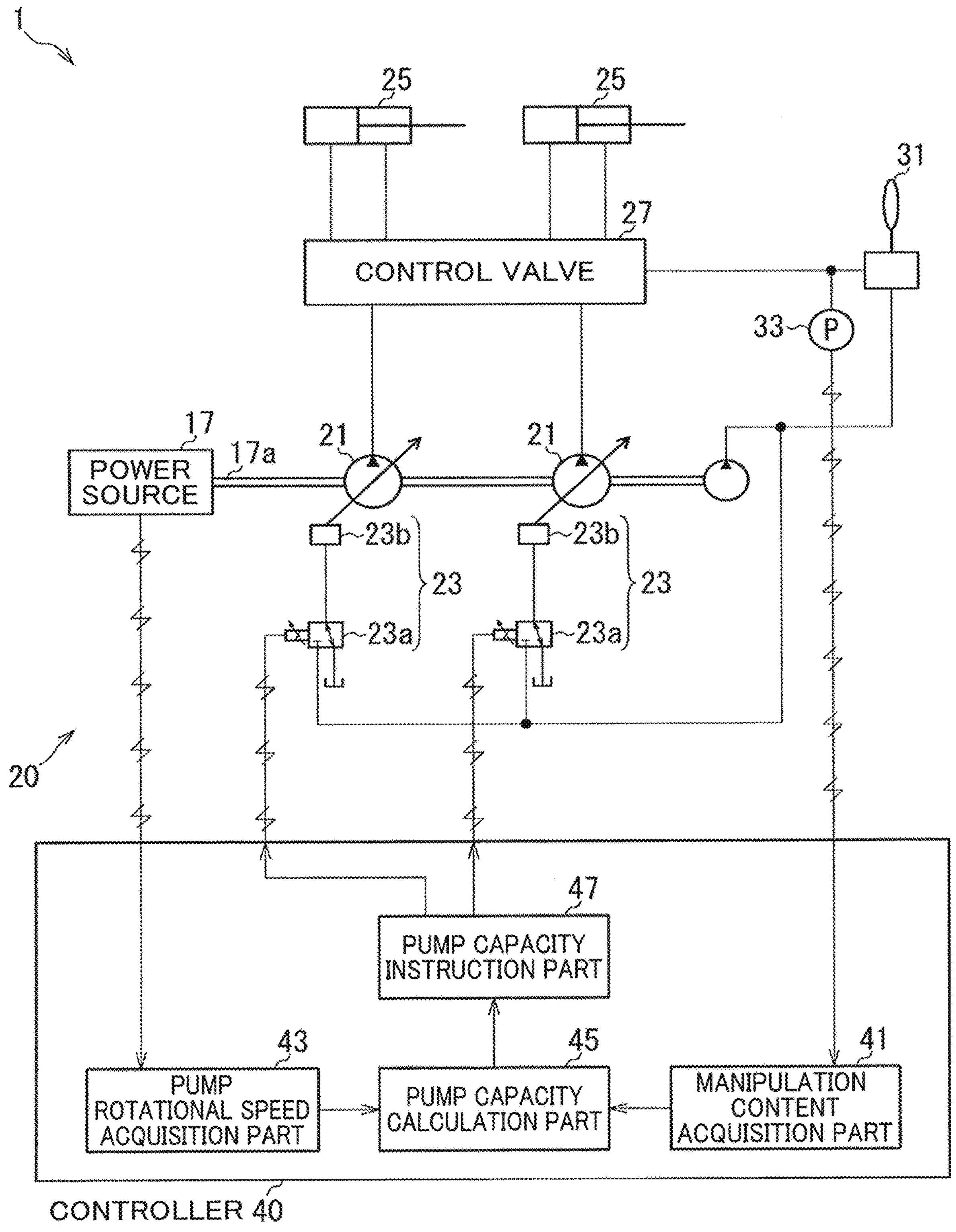
FIG. 2 is a circuit diagram of a hydraulic driving system according to an embodiment.

The actuator 25 is a hydraulic actuator that is activated by a supply of the oil or hydraulic fluid discharged from the pump 21. The actuator 25 operates the working machine 10. The actuator 25 is connected to the pump 21 via an oil line constituting a flow passage for the oil. The hydraulic circuit 20 includes at least one actuator 25. In the embodiment, the hydraulic circuit 20 includes a plurality of actuators 25. For instance, as illustrated in FIG. 1, the actuators 25 include a boom cylinder 25*a*, an arm cylinder 25*b*, a leading end attachment cylinder 25*c*, a traveling motor 25*d*, and a slewing motor 25*e*. The boom cylinder 25*a* raises and lowers the boom 15*a* with respect to the upper slewing body 13. The boom cylinder 25*a* is a telescopic cylinder or hydraulic cylinder configured to extend and contract by a supply of the oil. Each of the arm cylinder 25*b* and the leading end attachment cylinder 25*c* is a hydraulic cylinder like the boom cylinder 25*a*. The arm cylinder 25*b* rotates the arm 15*b* with respect to the boom 15*a*. The leading end attachment cylinder 25*c* rotates the leading end attachment 15*c* with respect to the arm 15*b*. In a case where the leading end attachment 15*c* is configured to sandwich a work target, the actuators 25 may include a cylinder or motor to drive an openable and closable member for sandwiching the work target. Alternatively, in a case where the leading end attachment 15*c* is configured to crush the work target, the actuators 25 may include a cylinder or motor to drive a member for crushing the work target. The traveling motor 25*d* makes the lower traveling body 11 travel. Specifically, for example, the traveling motor 25*d* may drive the crawler of the lower traveling body 11. Each of the traveling motor 25*d* and the slewing motor 25*e* is a hydraulic motor that rotates by a supply of the oil. The slewing motor 25*e* slews the upper slewing body 13 with respect to the lower traveling body 11. In FIG. 2, only the two hydraulic cylinders among the constituent elements of the actuators 25 are illustrated, and illustration of the remaining actuators 25 is omitted.

The control valve 27 controls an operation of each of the actuators 25. The control valve 27 is arranged in an oil line connecting the at least one pump 21 and the actuators 25 to each other. In the specific example shown in FIG. 2, the control valve 27 is arranged between two pumps 21 and the actuators 25. The control valve 27 is a directional switch valve for switching a direction of oil flow or oil line for the actuators 25 to be activated, and changes the direction (e.g.,, an extension or contraction direction, or a rotation direction) for the operation of the actuator 25. The control valve 27 may change the flow rate of the oil to be supplied to the actuator 25, or may change an operation speed of the actuator 25.

The manipulation part 31 is a part for manipulating the actuator 25. In a case where the operator manipulates the working machine 10, the manipulation part 31 may be arranged in the operating compartment 13*a* (see FIG. 1), or may be included in a device, i.e., a remote manipulating device, for a remote manipulation. The manipulation part 31 may include a manipulation lever, or may include a manipulative pedal. The manipulation part 31 outputs a manipulation instruction being an instruction for manipulation of the actuator 25. The manipulation part 31 outputs the manipulation instruction to the control valve 27, and manipulates the actuator 25 by controlling or manipulating the control valve 27. The manipulation instruction output by the manipulation part 31 may include a pilot pressure. In this case, the manipulation part 31 may be a hydraulic lever device including a hydraulic remote-control valve. The manipulation instruction output by the manipulation part 31 may be an electric signal. In this case, the manipulation part 31 may be an electric joystick.

The manipulation amount detector 33 detects a manipulation amount about the manipulation part 31. Hereinafter, the manipulation amount about the manipulation part 31 is simply referred to as a "manipulation amount". In the case where the operator manipulates the working machine 10, the manipulation amount detector 33 may detect a manipulation angle of the manipulation part 31 as the manipulation amount. In this case, the manipulation angle of the manipulation part 31 may be an angle of the manipulation lever, or may be an angle of the manipulation pedal. For instance, when the manipulation part 31 outputs a pilot pressure, that is, a secondary pressure of the hydraulic remote-control valve, on the basis of a manipulation amount, the manipulation amount detector 33 may be a pressure sensor that detects the pilot pressure. For example, when the manipulation part 31 outputs an electric signal corresponding to the manipulation amount, the manipulation amount detector 33 may detect the electric signal. In this case, the manipulation amount detector 33 may constitute a part of the controller 40.

In a case where the working machine 10 is manipulated through autonomous driving, a function of at least one of the manipulation part 31 and the manipulation amount detector 33 may constitute a part of the function of the controller 40. In this case, the controller 40 may include a function of controlling the autonomous driving of the working machine 10, a certain section corresponding to the manipulation part 31 included in the controller 40 may determine the content of the manipulation for the actuator 25, and a certain section corresponding to the manipulation amount detector 33 included in the controller 40 may acquire the content of the manipulation for the actuator 25.

The controller 40 includes a computer which executes: inputting and outputting of a signal; computation (processing); and storing information, the computer including a central processing unit and a memory or storage part. For example, various functions of the controller 40 arc realized by the central processing unit executing a program stored in the storage part of the controller 40. For instance, the controller 40 may be operable to cause the working machine 10 to autonomously drive. The controller 40 may output an instruction to the control valve 27 to manipulate the actuator 25.

The controller 40 executes various controls. For instance, the controller 40 executes a control of changing, on the basis of a pump rotational speed N, an upper limit value R of a magnitude of a pump capacity change amount Δq being a change amount of the pump capacity q per unit time. The unit time may be one control cycle of the controller 40, a second, or a minute. The definition is applied to the term "unit time" in the following description as well.

A part of or a whole of the controller 40 may be mounted to the working machine 10 or may be arranged outside the working machine 10. The controller 40 includes a manipulation content acquisition part 41, a pump rotational speed acquisition part 43, a pump capacity calculation part 45, and a pump capacity instruction part 47.

The manipulation content acquisition part 41 acquires a manipulation content for each actuator 25. The manipulation content for the actuator includes a content of a manipulation for manipulating the actuator 25. Specifically, in the case where the operator manipulates the working machine 10, the manipulation content for the actuator 25 may be a content of a manipulation applied to the manipulation lever or the manipulation pedal of the manipulation part 31 by the operator. In this case, the manipulation content may include information about a manipulation amount of the manipulation, may include information about a manipulation direction for the manipulation, or may include information about both the manipulation amount of the manipulation and the manipulation direction for the manipulation. In the case where the working machine 10 is manipulated through autonomous driving, the manipulation content for the actuator 25 may be a content of an instruction which the controller 40 outputs to the control valve 27 to manipulate the actuator 25.

The case where the operator manipulates the working machine 10 will be specifically described as an example below. The manipulation content acquisition part 41 may acquire a manipulation content of the manipulation part 31 as a manipulation content for the actuator 25. The "manipulation content" acquired by the manipulation content acquisition part 41 may include information about presence or absence of a manipulation to the manipulation part 31. The "manipulation content" acquired by the manipulation content acquisition part 41 may include information about a manipulation direction and a manipulation amount for one or more actuators 25 each to be a manipulation target of the manipulation part 31. The manipulation content acquisition part 41 may acquire a detection result (e.g., an electric signal) from the manipulation amount detector 33. Specifically, the manipulation content acquisition part 41 may acquire the manipulation amount about the manipulation part 31 detected by the manipulation amount detector 33. In the case where the working machine 10 autonomously drives, the manipulation content acquisition part 41 may acquire the content or manipulation content in an instruction set by a certain section, i.e., an autonomous driving control section, corresponding to the manipulation part 31 included in the controller 40.

The pump rotational speed acquisition part 43 acquires the pump rotational speed N. The pump rotational speed acquisition part 43 may acquire a detection value of the pump rotational speed N of the input shaft of the pump 21. The pump rotational speed acquisition part 43 may acquire the pump rotational speed N by acquiring the rotational speed (e.g., the engine rotational speed) of the power source 17. In this case, for instance, the pump rotational speed acquisition part 43 may acquire a detection value of the rotational speed of the power source 17, or may acquire an instruction of the rotational speed from the controller 40 to the power source 17. When the rotational speed of the power source 17 and the pump rotational speed N differ from each other, the pump rotational speed acquisition part 43 may calculate the pump rotational speed N on the basis of the rotational speed of the power source 17.

The pump capacity calculation part 45 calculates a pump capacity q to be instructed from the controller 40 to the pump capacity regulator 23. The pump capacity calculation part 45 calculates or determines the pump capacity q on the basis of the manipulation content of the manipulation part 31 acquired by the manipulation content acquisition part 41 and the rotational speed N acquired by the pump rotational speed acquisition part 43. The calculation of the pump capacity q will be described in detail later.

The pump capacity instruction part 47 instructs the pump capacity q. Specifically, the pump capacity instruction part 47 outputs a pump capacity instruction being an instruction for the pump capacity q calculated by the pump capacity calculation part 45 to the pump capacity regulator 23. The pump capacity instruction output by the pump capacity instruction part 47 may be, for example, an electric signal (e.g., an electric current value).

The hydraulic driving system 1 is configured to operate as described below. Hereinafter, arithmetic processing or calculation to be executed by the pump capacity calculation part 45 of the controller 40 will be described.

Calculation of A Target Pump Capacity qr According to a Manipulation Content

The controller 40 may execute a positive control. The controller 40 calculates a target pump capacity qr indicating a target value of the pump capacity q in accordance with a manipulation content of the manipulation part 31 (e.g., on the basis of a manipulation amount about the manipulation part 31). Specifically, for example, a relation between the manipulation content of the manipulation part 31 and information about the target pump capacity qr is set in the controller 40 in advance. The relation may be, for example, in the form of a map, such as a positive control map.

The "information about the target pump capacity qr" may include the target pump capacity qr, or may include information substantially indicating the target pump capacity qr, that is, information correlated to the target pump capacity qr. The "information about the target pump capacity qr" may include a target value of a pump capacity instruction, that is, a target value of an instruction to be output from the controller 40 to the pump capacity regulator 23. Specifically, for instance, the "information about the target pump capacity qr" may include a target pump capacity instruction electric current Ir being a target of an electric current value.

Figure 3:
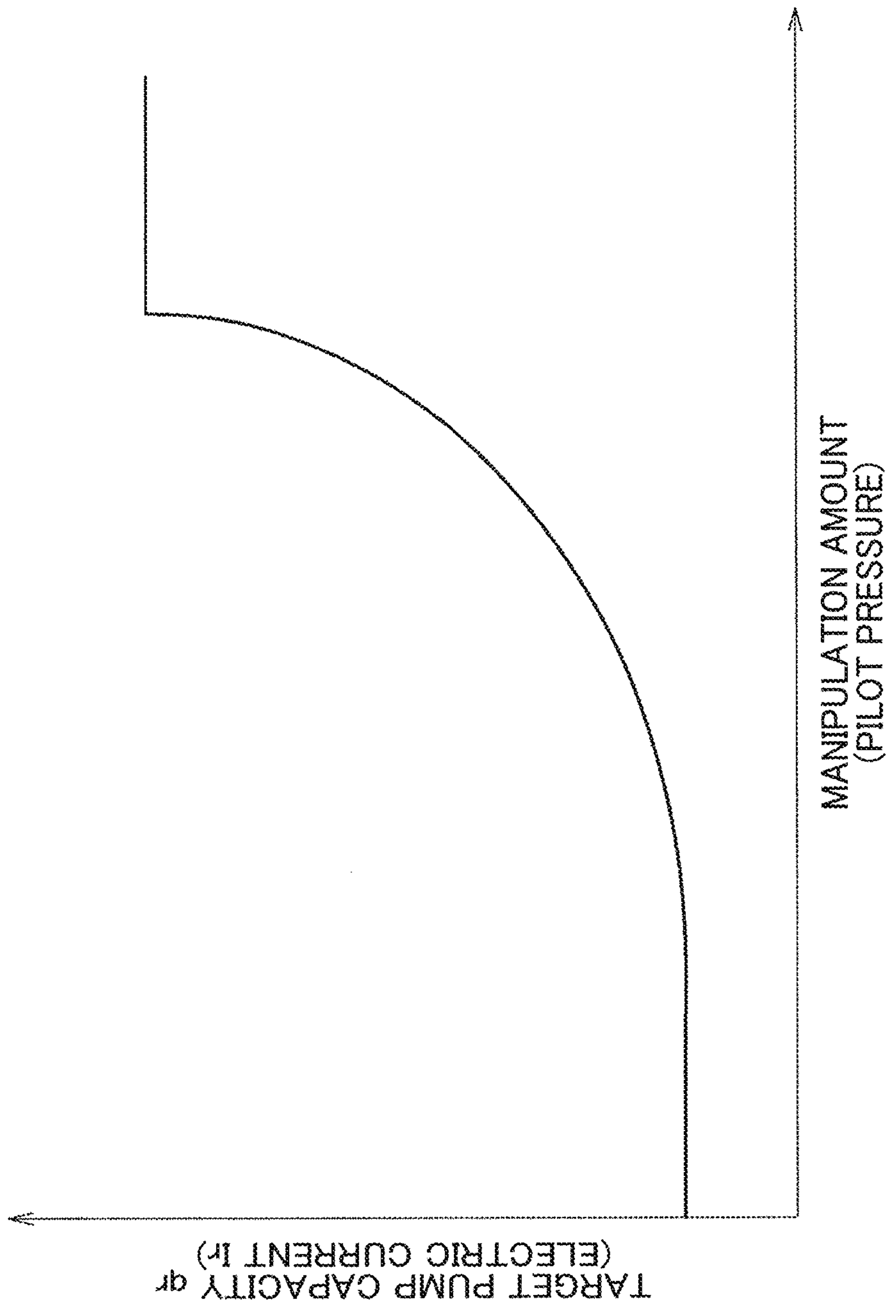
FIG. 3 is a graph showing a relation between a manipulation amount about a manipulation part and a target pump capacity of a pump each shown in FIG. 2.

FIG. 3 is a graph showing an example relation between a manipulation amount about the manipulation part 31 and the target pump capacity qr. The graph in FIG. 3 shows a relation between a manipulation amount (e.g., a pilot pressure) and a target pump capacity qr (e.g., a target pump capacity instruction electric current Ir) in manipulating a specific actuator 25 in a specific direction. The specific actuator 25 is any of the plurality of actuators 25. The specific direction means an operation direction (an extension or contraction direction, or a rotation direction) of the specific actuator. In FIG. 3, the target pump capacity instruction electric current Ir is simply referred to as an "electric current Ir" as well. The graph in FIG. 3 shows a relation including a curve section showing an increase in the target pump capacity qr along with an increase in the manipulation amount and a straight line section showing a fixed value of the target pump capacity qr when the manipulation amount reaches a specific value or larger. However, the shape of the curve section is variously settable. The straight line section of the graph is excludable. A part of or a whole of the curve section may be straight. The controller 40 may not calculate the target pump capacity qr with reference to the map as shown in FIG. 3. For instance, the controller 40 may execute the calculation of the target pump capacity qr according to the manipulation content of the manipulation part 31 on the basis of a specific formula.

Limitation on a Pump Capacity Change Amount Δq

Next, a control for a change in a manipulation amount in a predetermined manipulation content will be described. Specifically, a control for a change in a manipulation amount of a manipulation for moving a specific actuator 25 in a specific direction will be described. Examples of such a change in the manipulation amount in the predetermined manipulation content may include a change in an angle of a manipulation lever or a manipulation pedal.

The controller 40 changes the target pump capacity qr on the basis of a change in the manipulation amount (see FIG. 3). The controller 40 then changes an actual pump capacity q on the basis of the target pump capacity qr.

The controller 40 occasionally limits the pump capacity change amount Δq. The pump capacity change amount Δq is a magnitude or absolute value of the change amount of the pump capacity q per time unit. The pump capacity change amount Δq is denoted by a slope of a graph showing a relation between the pump capacity q and the time shown in FIG. 4.

Disadvantages Attributed to a Sudden Change in a Pump Discharge Flow Rate Q

Figure 5:
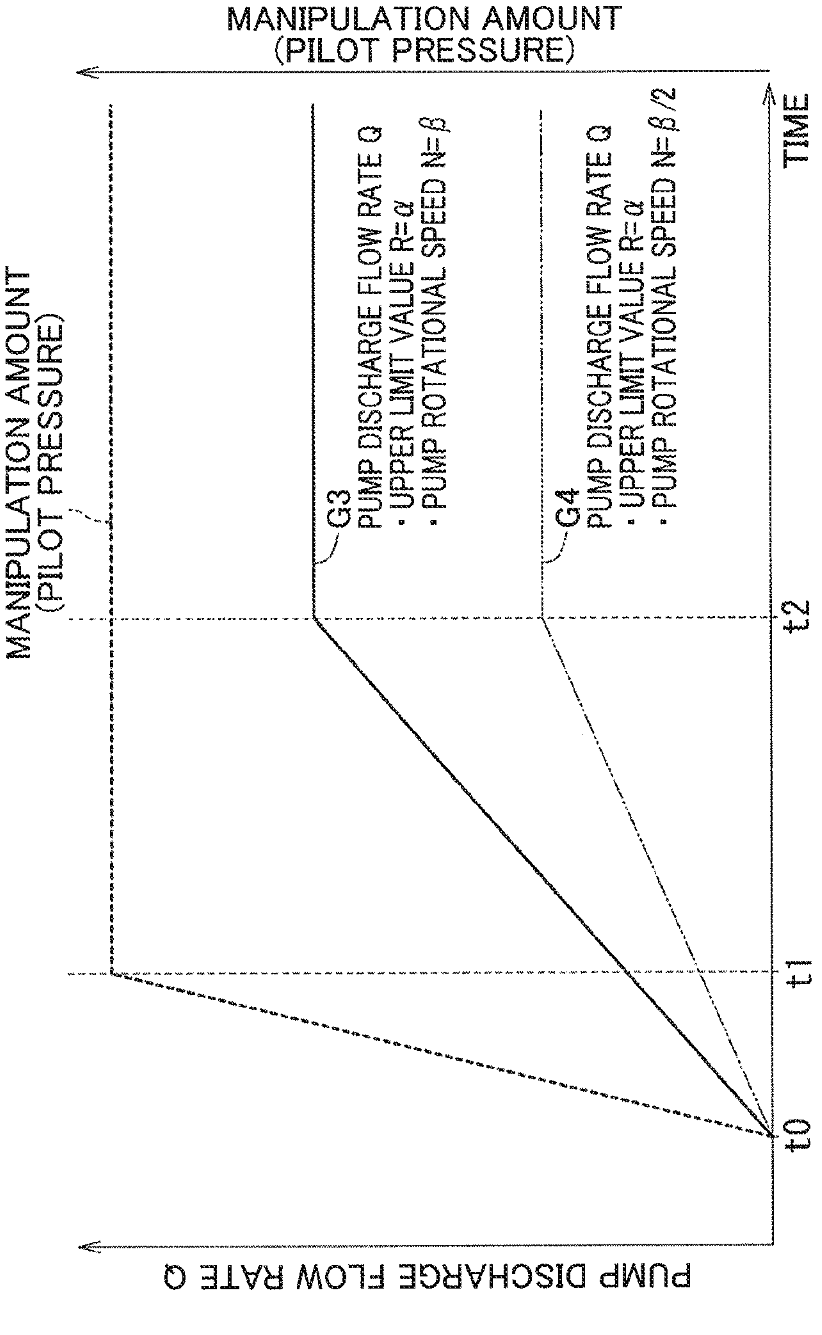
FIG. 5 includes graphs respectively showing a change over a period of time in the manipulation amount about the manipulation part and a change over a period of time in a pump discharge flow rate of the pump with an upper limit value being fixed.

A flow rate of oil discharged by the pump 21 per unit time is defined as a pump discharge flow rate Q (see FIG. 5). When the pump capacity change amount Δq is unlimited, disadvantages attributed to a sudden change (a sudden increase or a sudden reduction) in the pump discharge flow rate Q may be suffered. Specifically, a sudden change in a manipulation amount may lead to a sudden change in the target pump capacity qr to be determined by the controller 40 (see FIG. 3). When the pump capacity change amount Δq is unlimited, the sudden change in the target pump capacity qr leads to a sudden change in the pump capacity q, a sudden change in the pump discharge flow rate Q, and a sudden change in the flow rate of the oil to be supplied to the actuator 25. As a result, the actuator 25 may operate in an unpreferable manner, and cavitation may occur in the hydraulic circuit 20. Hereinafter, specific examples of the disadvantages attributed to such a sudden change in the pump discharge flow rate Q will be described. Disadvantages, i.e., "Disadvantages A", attributed to a sudden increase in the pump discharge flow rate Q and disadvantages, i.e., "Disadvantages B", attributed to a sudden reduction in the pump discharge flow rate Q will be described.

Disadvantages A: A sudden increase in a manipulation amount and a sudden increase in the pump discharge flow rate Q may lead to the following disadvantages.

Disadvantage A1: A sudden increase in the pump discharge flow rate Q may cause a shock in the working machine 10. Specifically, a sudden increase in the pump discharge flow rate Q may lead to a sudden increase in the flow to the actuator 25, a sudden acceleration of the actuator 25, and a shock, such as an impact, shaking, blowing down of the working machine 10. For instance, sudden acceleration of the actuator 25 from a suspension state may result in an activation shock being a shock in the working machine 10 attributed to the activation by the actuator 25.

Disadvantage A2: A sudden increase in the pump discharge flow rate Q may lead to an excessive output of the pump 21 over an output of the power source 17. Specifically, the output of the pump 21 is proportional to a product of a discharge pressure (P) of the pump 21 and the pump discharge flow rate Q. Hence, the sudden increase in the pump discharge flow rate Q leads to a sudden increase in the output of the pump 21. The sudden increase in the output of the pump 21 may delay a P-Q control to be executed by the controller 40. The P-Q control means a control of adjusting the output of the pump 21 to keep the output of the pump 21 from exceeding the output of the power source 17. When the P-Q control is delayed and the output of the pump 21 exceeds the output of the power source 17, the rotational speed of (the output shaft 17*a* of) the power source 17 may reduce, or the power source 17 may suspend (such as engine stall).

Disadvantage A2-1: A delay in the P-Q control and a reduction in the rotational speed of the power source 17 may lead to a reduction in the pump rotational speed N, a reduction in the pump discharge flow rate Q, and a reduction in the speed of the actuator 25. Besides, when the power source 17 suspends, the actuator 25 may suspend.

Disadvantage A2-2: Deduced is a case where the P-Q control is delayed, but the P-Q control is executed after the rotational speed of the power source 17 once reduces, and then, the rotational speed of the power source 17 increases or is restored. In this case, the flow rate of the oil to be supplied to the actuator 25 once reduces, and thereafter increases. As a result, the actuator 25 may not smoothly operate, for example, may operate in two stages.

Disadvantage A3: A sudden increase in the pump discharge flow rate Q may lead to a supply of the oil at an excessive flow rate to hydraulic equipment including, the actuator 25, the control valve 27, a pipe, and other element, and a sudden thrust of the oil into the hydraulic equipment. As a result, the hydraulic equipment may experience a sudden pressure fluctuation (receive a serge pressure) and then be damaged.

Disadvantage A4: A sudden increase in the pump discharge flow rate Q may lead to a supply of the oil at an excessive flow rate by the pump 21. In this case, fuel consumption of the working machine 10 deteriorates.

Disadvantages B: A sudden reduction in a manipulation amount and a sudden reduction in the pump discharge flow rate Q may lead to the following disadvantages.

Disadvantage B1: A sudden reduction in the pump discharge flow rate Q may lead to an occurrence of cavitation in the hydraulic circuit 20. For instance, the manipulation amount suddenly reduces from a value (at which the actuator 25 is allowed to operate) which is larger than zero to zero (at which the actuator 25 is kept from operating). Then, the flow rate of the oil to be supplied to the actuator 25 suddenly reduces. In contrast, a target object actuated by the actuator 25 continues to move while decelerating owing to an inertia force of the object even when the manipulation amount reaches zero. Specifically, for instance, when a manipulation amount of the manipulation to actuate the slewing motor 25*e* (see FIG. 1) reaches zero, the upper slewing body 13 being a target object to be actuated by the slewing motor 25*e* continues to slew or excessively slew. As a result, the oil to be supplied to the actuator 25 (e.g., the slewing motor 25*e*) lacks, and a pressure in a supply line being an oil line for supplying the oil to the actuator 25 reduces, and cavitation may occur at the actuator 25, the supply line, or other place. The cavitation is likely to occur at an actuator 25 that actuates a target object to have a relatively large inertia force among target objects to be actuated by the actuators 25 respectively. Specifically, for example, the cavitation is likely to occur at the slewing motor 25*e* to actuate the upper slewing body 13, the arm cylinder 25*b* to actuate the arm 15*b*, and other actuator.

Disadvantage B1-1: An occurrence of cavitation at the actuator 25 or a supply line shown in FIG. 2 may lead to a fluctuation in the flow rate of the oil to be supplied to the actuator 25 and a fluctuation in the speed of the actuator 25. As a result, the actuator 25 may operate in an unpreferable manner, and hunting may occur.

Disadvantage B1-2: An occurrence of cavitation at a supply line or other place may lead to a damage of the hydraulic equipment attributed to the cavitation.

Disadvantage B1-3: The hydraulic circuit 20 may include a makeup circuit to prevent an occurrence of cavitation. For instance, the actuator 25 may include a makeup port continuous to the makeup circuit. The makeup circuit prevents such an occurrence of cavitation by supplying the oil to the supply line of the actuator 25 from an oil line (tank line) linked to the tank. In this case, it is required to supply the oil to the tank line and ensure the pressure of the tank line so that the makeup circuit works.

Gentle Change in the Pump Discharge Flow Rate Q

A gentle change in a manipulation amount, specifically, a pump capacity change amount Δq smaller than an upper limit value R, is unlikely to lead to the above-listed disadvantages attributed to a sudden change in the pump discharge flow rate Q. The controller 40 thus may avoid limiting the pump capacity change amount Δq in such a gentle change in the manipulation amount. In this case, the controller 40 may control an actual pump capacity q to a target pump capacity qr corresponding to the manipulation amount. Specifically, the controller 40 may, for example, determine the target pump capacity qr corresponding to the manipulation amount with the map shown in FIG. 3, and control the actual pump capacity q to the target pump capacity qr. For instance, a result of "NO" in step S31 and a result of "NO" in step S41 in FIG. 8 to be described later fall within a range of the gentle change in the manipulation amount.

Upper Limit Value R

The controller 40 occasionally limits a pump capacity change amount Δq to avoid the disadvantages attributed to a sudden change in the pump discharge flow rate Q. Hereinafter, such limitation on the pump capacity change amount Δq by the controller 40 will be mainly described. The controller 40 limits the pump capacity change amount Δq so that the magnitude or absolute value of the pump capacity change amount Δq is equal to or smaller than the upper limit value R. The upper limit value R indicates an upper limit value (limit amount) of the magnitude or absolute value of the pump capacity change amount Δq. The controller 40 may set an upper limit value R of a magnitude of a pump capacity change amount Δq at an increase in the pump capacity q, that is, an upper limit value R for the increase, and may set an upper limit value R of a magnitude of a pump capacity change amount Δq at a reduction in the pump capacity q, that is, an upper limit value R for the reduction. The controller 40 may limit the pump capacity change amount Δq at each of the increase and the reduction in the pump capacity q. The upper limit value R for the increase and the upper limit value R for the reduction may differ from each other, or may be the same. The controller 40 may limit the pump capacity change amount Δq at only one of the increase and the reduction in the pump capacity change amount q. Hereinafter, the limitation on the pump capacity change amount Δq at each of the increase and the reduction in the pump capacity q by the controller 40 will be mainly described.

Specifically, the upper limit value R indicates, for example, an upper limit of a change amount of a pump capacity instruction output from the controller 40 to the pump capacity regulator 23 per unit time. When the pump capacity instruction indicates an electric current value or a pump capacity instruction electric current, the upper limit value R indicates an upper limit of a change amount or a gain of the electric current value per unit time. The unit of the upper limit value R in this case may include "mA/control cycle", "mA/sec (second)" or "mA/min (minute)".

FIG. 4 shows a relation between a time and a pump capacity q for no limitation on the pump capacity change amount Δq (graph G1) and limitation thereon (graph G2). FIG. 4 further shows a relation between the time and a manipulation amount. The manipulation amount increases for a period from time t0 to time t1, and are fixed at a predetermined manipulation amount at time t1 and thereafter.

In no limitation on the pump capacity change amount Δq (graph G1), the manipulation amount increases and the pump capacity q increases for a period from time t0 to time t1. The pump capacity q reaches a target pump capacity qr being a pump capacity q corresponding to a predetermined manipulation amount at the same time or substantially at the same time (at time t1) as the manipulation amount reaches the predetermined amount and is fixed thereat, and thereafter, the pump capacity is fixed at the target pump capacity.

In the limitation on the pump capacity change amount Δq (graph G2), the manipulation amount increases and the pump capacity q increases for a period from time t0 to time t2. Time t2 is later than time t1. The pump capacity change amount Δq, that is, a slope of a graph, is smaller and an acceleration rate of the pump capacity q is slower in the limitation on the pump capacity change amount Δq than the amount and the acceleration rate in the no limitation on the pump capacity change amount Δq. The pump capacity q continues to increase until reaching the target pump capacity qr being the pump capacity q corresponding to the predetermined manipulation amount in the period from time t1 to time t2 after the manipulation amount reaches the predetermined manipulation amount and is fixed thereat. At time t2 and thereafter, the pump capacity q is kept fixed at the target pump capacity qr.

Degree of the Upper Limit Value R

The upper limit value R may be variously set in accordance with a manipulation content of the manipulation part 31 shown in FIG. 2. An appropriate upper limit value R varies depending on a manipulation direction and a manipulation amount for an actuator 25 to be manipulated. Accordingly, the upper limit value R may be changed depending on a kind of the actuator 25. The controller 40 sets the upper limit value R to an appropriate degree in accordance with the manipulation content. For instance, a relation (such as a map) between the manipulation content and the upper limit value R may be set in advance in the controller 40. For instance, the controller 40 may calculate, on the basis of a preset formula, the upper limit value R in accordance with the manipulation content.

A too large upper limit value R may lead to an increase in the magnitude or absolute value of the pump capacity change amount Δq, which may lead to the disadvantages attributed to a sudden change in the pump discharge flow rate Q as described above.

Disadvantages Attributed to a Delay in a Change in the Pump Discharge Flow Rate Q In contrast, a too small upper limit value R may lead to a reduction in the magnitude or absolute value of the pump capacity change amount Δq and a delay in a change in the pump discharge flow rate Q.

Disadvantages C: Specifically, a too small magnitude of the pump capacity change amount Δq in relation to a change amount of the manipulation amount may lead to a delay in a change in the pump discharge flow rate Q, and a delay in a change in the flow rate of the oil to be supplied to the actuator 25. The delay may deteriorate responsiveness of a speed change in the actuator 25 to the change in the manipulation amount. When the operator manipulates the working machine 10, the delay in the change in the pump discharge flow rate Q may deteriorate the operability of the actuator 25.

Disadvantage C-1: Specifically, a too small pump capacity change amount Δq in relation to an increase in the manipulation amount may lead to a delay in an increase in the flow rate of the oil to be supplied to the actuator 25. A flow rate required for activation of the actuator 25 is thus not ensured, and the acceleration of the actuator 25 is lowered.

Disadvantage C-2: A too small magnitude or absolute value of the pump capacity change amount Δq in relation to a reduction in the manipulation amount may lead to lowering of the deceleration of the actuator 25.

Pump Discharge Flow Rate Change Amount ΔQ

As described above, the pump capacity q changes and the pump discharge flow rate Q changes as the manipulation amount changes. The pump discharge flow rate Q is proportional to a product of the pump rotational speed N and the pump capacity q. Specifically, for instance, the pump discharge flow rate Q is expressed with the following equation.

$$\text{Pump discharge flow rate } Q\,(\text{L/min}) = \text{pump capacity } q\,(\text{cm}^3) \times \text{pump rotational speed } N\,(\text{rotations/min})/1000$$

Here, a change amount of the pump discharge flow rate Q per unit time is defined as a pump discharge flow rate change amount ΔQ. The pump discharge flow rate change amount ΔQ may be referred to as a flow rate change gain, a flow rate increase gain, or a flow rate reduction gain. The pump discharge flow rate change amount ΔQ is denoted by a slope of a graph showing a relation between the discharge flow rate Q and the time in FIG. 5.

Disadvantages Attributed to No Change in the Upper Limit Value R Based on the Rotational Speed N As described above, the pump discharge flow rate Q is proportional to a product of the pump rotational speed N and the pump capacity q. Hence, the pump discharge flow rate change amount ΔQ is proportional to the pump rotational speed N. As shown in graph G3 and graph G4 in FIG. 5, the pump discharge flow rate change amounts ΔQ differ from each other when the pump rotational speeds N differ from each other regardless of the same upper limit values R of the pump capacity change amounts Δq. The higher the rotational speed N is, the larger the pump discharge flow rate change amount ΔQ is. The larger pump discharge flow rate change amount ΔQ is more likely to lead to "Disadvantages attributed to a sudden change in a pump discharge flow rate Q" described above. In this regard, the upper limit value R is, for example, set to avoid "Disadvantages attributed to a sudden change in a pump discharge flow rate Q" for a pump rotational speed N being a specific "low pump rotational speed N". In this setting, however, such a pump rotational speed N that is higher than the "low pump rotational speed N" may lead to the disadvantages attributed to a sudden change in the pump discharge flow rate Q. In contrast, the upper limit value R is, for example, set to avoid "Disadvantages attributed to a sudden change in a pump discharge flow rate Q" for a pump rotational speed N being a specific "high pump rotational speed N". In this setting, however, such a pump rotational speed N that is lower than the "high pump rotational speed N" may lead to "Disadvantages attributed to a delay in a change in the pump discharge flow rate Q" described above.

FIG. 5 includes graphs respectively showing a change over a period of time in the manipulation amount about the manipulation part 31 and a change over a period of time in a pump discharge flow rate of the pump 21 with an upper limit value R being fixed. Specifically, FIG. 5 shows a relation between the time and the pump discharge flow rate Q for a pump rotational speed N indicating "β" (graph G3) and a pump rotational speed N indicating "(β/2)" (graph G4) under the setting of the upper limit value R to a fixed value (α). FIG. 5 further shows a relation between the time and the manipulation amount in the same manner as FIG. 4.

In each of the case of "β" of the pump rotational speed N (graph G3) and the case of "(β/2)" of the pump rotational speed N (graph G4), the manipulation amount increases and the pump discharge flow rate Q increases for a period from time t0 to time t2. The pump discharge flow rate change amount ΔQ (the slope of graph G4) in the case of "(β/2)" of the rotational speed N is a value of ½ of the pump discharge flow rate change amount ΔQ (the slope of graph G3) in the case of "β" of the pump rotational speed N.

At time t2 and thereafter, the pump capacity q is kept at a fixed value or target pump capacity qr which is common in graph G3 and graph G4. In this example, the pump discharge flow rate Q in graph G4 reaches and is kept at a value of ½ of the pump discharge flow rate Q in graph G3 at time t2 and thereafter. In graph G3 and graph G4, the pump discharge flow rate change amounts ΔQ (the slopes of the graphs) differ from each other at an increase in respective pump capacities q for the period from time t0 to time t2.

Specific Example With Numeral Values

A difference between pump discharge flow rate change amounts ΔQ having the same upper limit values R at different rotational speeds N will be described with specific numeral values. The pump 21 shown in FIG. 2 is defined to have a minimum capacity or minimum value of the pump capacity q of 10 $cm^3$/rev, and a maximum capacity or maximum value of the pump capacity q of 200 $cm^3$/rev. The controller 40 is supposed to set the upper limit value R of the pump capacity change amount Δq to 10 cc per 0.1 sec.

In a case where the pump rotational speed N indicates 1000 rotations/min, for instance, the pump discharge flow rate Q at time t=0 (sec) reaches 10 L/min, the pump discharge flow rate Q at time t=0.5 (sec) reaches 60 L/min, and the pump discharge flow rate Q at time t=1 (sec) reaches 110 L/min. In this case, the pump discharge flow rate change amount ΔQ per second is 100 L/min.

In a case where the pump rotational speed N indicates 2000 rotations/min, for instance, the pump discharge flow rate Q at time t=0 (sec) reaches 20 L/min, and the pump discharge flow rate Q at time t=0.5 (sec) reaches 120 L/min, and the pump discharge flow rate Q at time t=1 (sec) reaches 220 L/min. In this case, the pump discharge flow rate change amount ΔQ per second is 200 L/min.

An example where a pump discharge flow rate change amount ΔQ has a threshold of 120 L/min which may result in a disadvantage of an activation shock of the actuator 25 (being an example of the disadvantages attributed to a sudden change in the pump discharge flow rate change amount ΔQ) will be described. In this example, in the case where the pump rotational speed N indicates 1000 rotations/min, the pump discharge flow rate change amount ΔQ per second is 100 L/min and is thus lower than the threshold (120 L/min). This avoids the disadvantage attributed to the activation shock. In contrast, in the case where the pump rotational speed N indicates 2000 rotations/min, the pump discharge flow rate change amount ΔQ per second is 200 L/min and thus exceeds the threshold (120 L/min). This may results in the disadvantage attributed to the activation shock.

Next, another example where a pump discharge flow rate change amount ΔQ has a threshold of 220 L/min which may result in a disadvantage attributed to the activation shock of the actuator 25 will be described. In this example, the disadvantage attributed to activation shock is avoided at the pump rotational speed N of 2000 rotations/min. In contrast, the pump rotational speed N of 1000 rotations/min may result in the disadvantage attributed to a delay in a change in the pump discharge flow rate Q.

Upper Limit Value R Based on the Pump Rotational Speed N

In the embodiment, the controller 40 changes the upper limit value R of the magnitude or absolute value of the pump capacity change amount Δq being a change amount of the pump capacity per unit time on the basis of the pump rotational speed N.

Specifically, for instance, the controller 40 may set the upper limit value R in accordance with the following Condition 1, Condition 2, and Condition 3. Each condition is defined for a manipulation or a predetermined manipulation content to move a specific actuator 25 in a specific direction. When the specific actuator 25 to be manipulated is changed or the manipulation direction is changed, each condition below may not be always satisfied. Further, each condition may be satisfied when the pump rotational speed N falls within a predetermined range, and may not be satisfied when the rotational speed N is out of the predetermined range. The predetermined range will be described in detail later.

Figure 6:
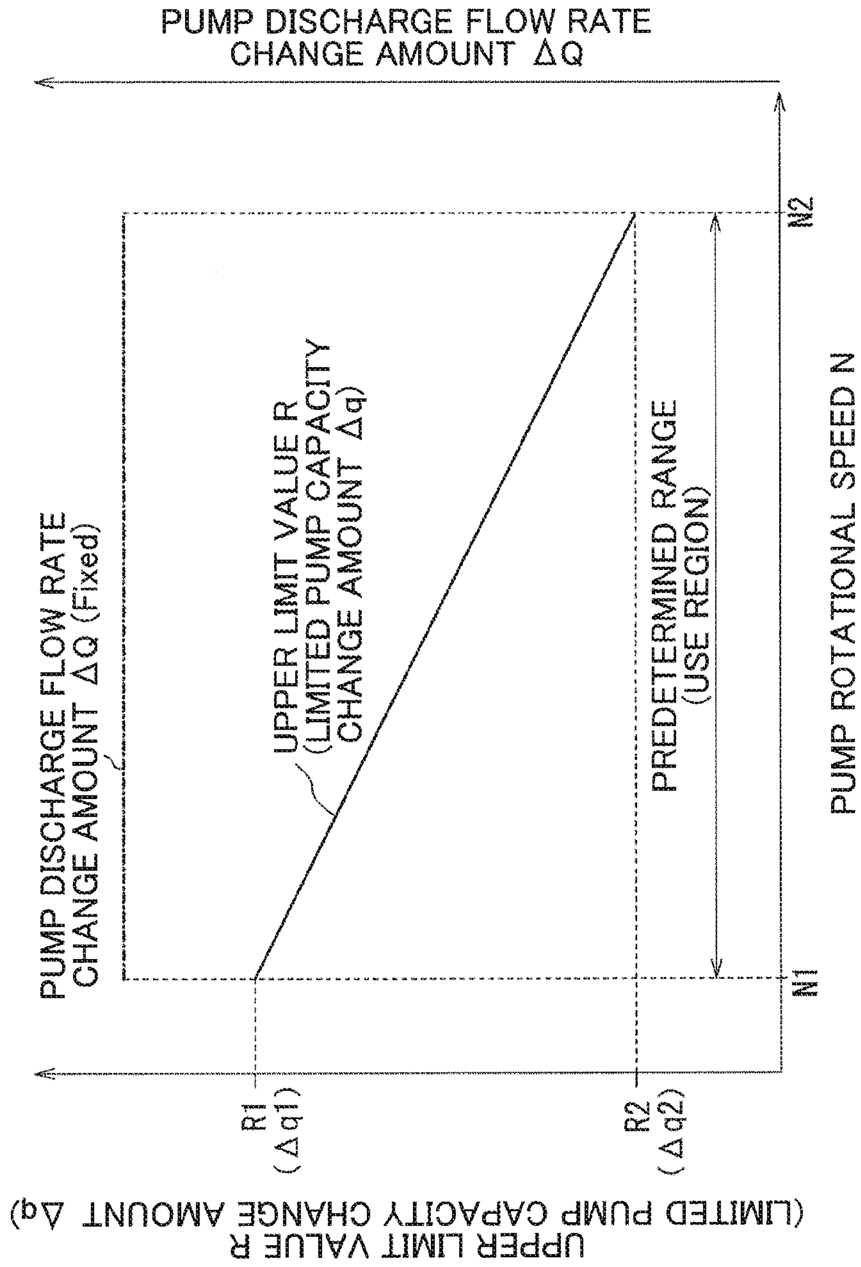
FIG. 6 is a graph showing a relation of an upper limit value to a pump rotational speed of the pump and a relation of a pump discharge flow rate change amount to the pump rotational speed of the pump.

Condition 1: As shown in FIG. 6, the controller 40 sets the upper limit value R to a first upper limit value R1 when the pump rotational speed N is a first rotational speed N1. The controller 40 preferably sets the upper limit value R to a second upper limit value R2 which is smaller than the first upper limit value R1 when the pump rotational speed N is a second rotational speed N2 which is higher than the first rotational speed N1. In this case, a magnitude of a pump capacity change amount Δq1, when the pump rotational speed N is the first rotational speed N1, is limited by the first upper limit value R1, and a magnitude of a pump capacity change amount Δq2, when the pump rotational speed N is the second rotational speed N2, is limited by the second upper limit value R2.

The controller 40 preferably sets the upper limit value R so that the magnitude or absolute value of the pump capacity change amount Δq at the second rotational speed N2 is smaller than the magnitude or absolute value of the pump capacity change amount Δql at the first rotational speed N1. The hydraulic driving system 1 can avoid the disadvantages attributed to a sudden change in the pump discharge flow rate Q and avoid the disadvantages attributed to a delay in a change in the pump discharge flow rate Q by setting the upper limit value R in the manner described above regardless of the pump rotational speed N.

Condition 1a: For instance, the controller 40 may preset a threshold about the pump rotational speed N. The threshold may be set before setting of the upper limit value R. The controller 40 may set the upper limit value R to the first upper limit value R1 when the rotational speed N is lower than the threshold, and may set the upper limit value R to the second upper limit value R2 when the pump rotational speed N is equal to or higher than the threshold. In this case, the first rotational speed N1 has a value falling within a range which is lower than the threshold, and the second rotational speed N2 has a value falling within a range which is equal to or higher than the threshold.

Condition 2: The controller 40 preferably sets the upper limit value R in such a manner that the upper limit value R decreases as the pump rotational speed N increases. In this case, the magnitude or absolute value of the pump capacity change amount Δq is limited by the upper limit value R which decreases as the pump rotational speed N increases. The controller 40 preferably sets the upper limit value R in such a manner that the magnitude or absolute value of the pump capacity change amount Δq reduces as the pump rotational speed N increases.

Condition 2a: For instance, the controller 40 may gradually decrease the upper limit value R as the pump rotational speed N increases. Condition 2b: For instance, the controller 40 may continuously decrease the upper limit value R as the pump rotational speed N increases. In this case, a graph (a graph satisfying Condition 2b) showing a relation between the pump rotational speed N and the upper limit value R may be in the form of a straight line or a curve line. Condition 2b1: For instance, the controller 40 preferably sets the upper limit value R in such a manner that the upper limit value R is proportional to the pump rotational speed N (e.g., see Equation 1 below). The controller 40 preferably sets the upper limit value R in such a manner that the magnitude of the pump capacity change amount Δq limited by the upper limit value R is proportional to the pump rotational speed N.

Condition 3: The controller 40 preferably sets the upper limit value R so that the pump discharge flow rate change amount ΔQ is fixed regardless of any rotational speed of the pump rotational speed N within a predetermined range. The controller 40 preferably sets the upper limit value R so that the pump discharge flow rate change amount ΔQ is fixed regardless of the pump rotational speed N. The "predetermined range" for the pump rotational speed N may be a range for the pump rotational speed N for use at, for example, an operation of the working machine 10, e.g., a use region, or may be a range narrower than the use region.

FIG. 6 is a graph showing a relation between the pump rotational speed N and the upper limit value R and a relation between the pump rotational speed N and the pump discharge flow rate change amount ΔQ. The upper limit value R in the graph in FIG. 6 may be a magnitude or absolute value of the pump capacity change amount Δq limited by the upper limit value R. The controller 40 may set the magnitude of the pump capacity change amount Δq to the upper limit value R set on the basis of the pump rotational speed N. The graph satisfies Condition 1, Condition 2, Condition 2b1, and Condition 3.

Calculation of the Upper Limit Value R

Specifically, for instance, the controller 40 may calculate the upper limit value R in a manner to be described below.

First, the controller 40 determines a reference upper limit value Rs being an upper limit value R at a reference rotational speed Ns as a reference of the pump rotational speed N. The reference rotational speed Ns may be, for example, a maximum value or high idling level in a use region of the pump rotational speed N, or may be a value other than the high idling level. For instance, a relation (map) between a manipulation content and the reference upper limit value Rs may be preset in the controller 40. For example, the controller 40 may calculate the reference upper limit value Rs in accordance with a predetermined condition, such as a formula. The controller 40 further calculates a rotational speed ratio being a ratio between the reference rotational speed Ns and a present pump rotational speed N, i.e., a use rotational speed Nc. The rotational speed ratio is expressed as, for example, "(Ns/Nc)". Subsequently, the controller 40 calculates the upper limit value R at the use rotational speed Nc on the bases of the reference upper limit value Rs and the rotational speed ratio (Ns/Nc). The calculation of the upper limit value R at the present use rotational speed Nc based on the reference upper limit value Rs at the reference rotational speed Ns is rephrased as correction of the reference upper limit value Rs at the reference rotational speed Ns to the upper limit value R at the present use rotational speed Nc.

Specifically, for instance, the controller 40 may calculate a degree a of the upper limit value R by the following Equation 1.

$$\alpha = \text{reference upper limit value } Rs \times (\text{reference rotational speed } Ns/\text{use rotational speed } Nc) \quad \text{Equation 1}$$

In this case, as shown in FIG. 6, the pump discharge flow rate change amount ΔQ is fixed at any pump rotational speed N within the predetermined range or use region.

Specific Example With Numeral Values

A relation between a pump rotational speed N and an upper limit value R will be further described with specific numeral values. In a case where a manipulation content for an actuator is a predetermined manipulation content, a pump discharge flow rate change amount ΔQ per second is supposed to have a threshold of 200 L/min to avoid the disadvantages attributed to a sudden change in the pump discharge flow rate Q. Hereinafter, the upper limit value R is calculated so that the pump discharge flow rate change amount ΔQ per second reaches 2001 L/min in each of the case where the pump rotational speed N indicates 1000 rotations/min and the case where the rotational speed N indicates 2000 rotations/min. Described here is a case where the pump capacity instruction indicates an electric current value or a pump capacity instruction electric current and the upper limit value R indicates an upper limit of a change amount of the electric current value per unit time.

Calculation 1: In the case where the pump rotational speed N indicates 2000 (rotations/min), a pump capacity change amount Δq required to adjust the pump discharge flow rate change amount ΔQ per second to 200 (L/min) being the threshold is calculated with the following equation.

$$200\,(\text{L/min/sec}) \div 2000\,(\text{rotations/min}) \times 1000 = 100(\text{cm}^3/\text{sec})$$

When a control cycle of the controller 40 is defined as 10 (msec), the pump capacity change amount Δq resulting from converting the "unit time" into one control cycle may be calculated with the following equation.

$$100\,(\text{cm}^3/\text{sec}) \times 10\,(\text{msec}) \div 1000\,(\text{msec}) = 1\,(\text{cm}^3/\text{control cycle})$$

A change amount of the pump capacity instruction electric current for a change in the pump capacity q by 1 $\text{cm}^3$ is defined as 20 ($\text{m/cm}^3$). Then, the change amount of the pump capacity instruction electric current per control cycle to adjust the pump capacity change amount Δq to 1 ($\text{cm}^3$/control cycle) is calculated with the following equation.

$$20\,(\text{mA/cm}^3) \times 1(\text{cm}^3/\text{control cycle}) = 20(\text{mA/control cycle})$$

Therefore, setting of the change amount of the pump capacity instruction electric current per control cycle (the upper limit value R) to 20 (mA/control cycle) enables adjustment of the pump discharge flow rate change amount ΔQ per second to 200 (L/min), that is, to the threshold.

Calculation 2: In the case where the pump rotational speed N indicates 1000 (rotations/min), a pump capacity change amount Δq required to adjust the pump discharge flow rate change amount ΔQ per second to 200 (L/min) being the threshold is calculated with the following equation.

$$200\,(\text{L/min/sec}) \div 1000\,(\text{rotations/min}) \times 1000 = 200\,(\text{cm}^3/\text{sec})$$

In this example, a control cycle of the controller 40 is set to 10 (msec). Thus, the pump capacity change amount Δq resulting from converting the "unit time" into the one control cycle is calculated with the following equation.

$$200\,(\text{cm}^3/\text{sec}) \times 10\,(\text{msec}) \div 1000(\text{msec}) = 2\,(\text{cm}^3/\text{control cycle})$$

In this example, the change amount of the pump capacity instruction electric current required to change the pump capacity q by 1 ($\text{cm}^3$) is 20 ($\text{mA/cm}^3$). Then, the change amount of the pump capacity instruction electric current per control cycle to adjust the pump capacity change amount Δq to 2 ($\text{cm}^3$/control cycle) is calculated with the following equation.

$$20\,(\text{mA/cm}^3) \times 2(\text{cm}^3/\text{control cycle}) = 40(\text{mA/control cycle})$$

Therefore, setting of the change amount of the pump capacity instruction electric current per control cycle (the upper limit value R) to 40 (mA/control cycle) enables adjustment of the pump discharge flow rate change amount ΔQ per second to 200 (L/min), that is, to the threshold. The validity or adequacy of Equation 1 will be discussed. The reference rotational speed Ns is defined as 2000 (rotations/min) and the reference upper limit value Rs is defined as 20 (mA/control cycle) on the basis of the state in Calculation 1. The upper limit value R at 1000 (rotations/min) of the use rotational speed Nc is calculated in the following manner with Equation 1.

$$20\,(\text{mA/control cycle}) \times 2000/1000 = 40\,(\text{mA/control cycle})$$

A result of the calculation agrees with the upper limit value R calculated with Equation 2. Similarly, such an upper limit value R as to make the pump discharge flow rate change amount ΔQ reach the threshold even at any variously changed pump rotational speed N is calculatable with Equation 1.

Figure 7:
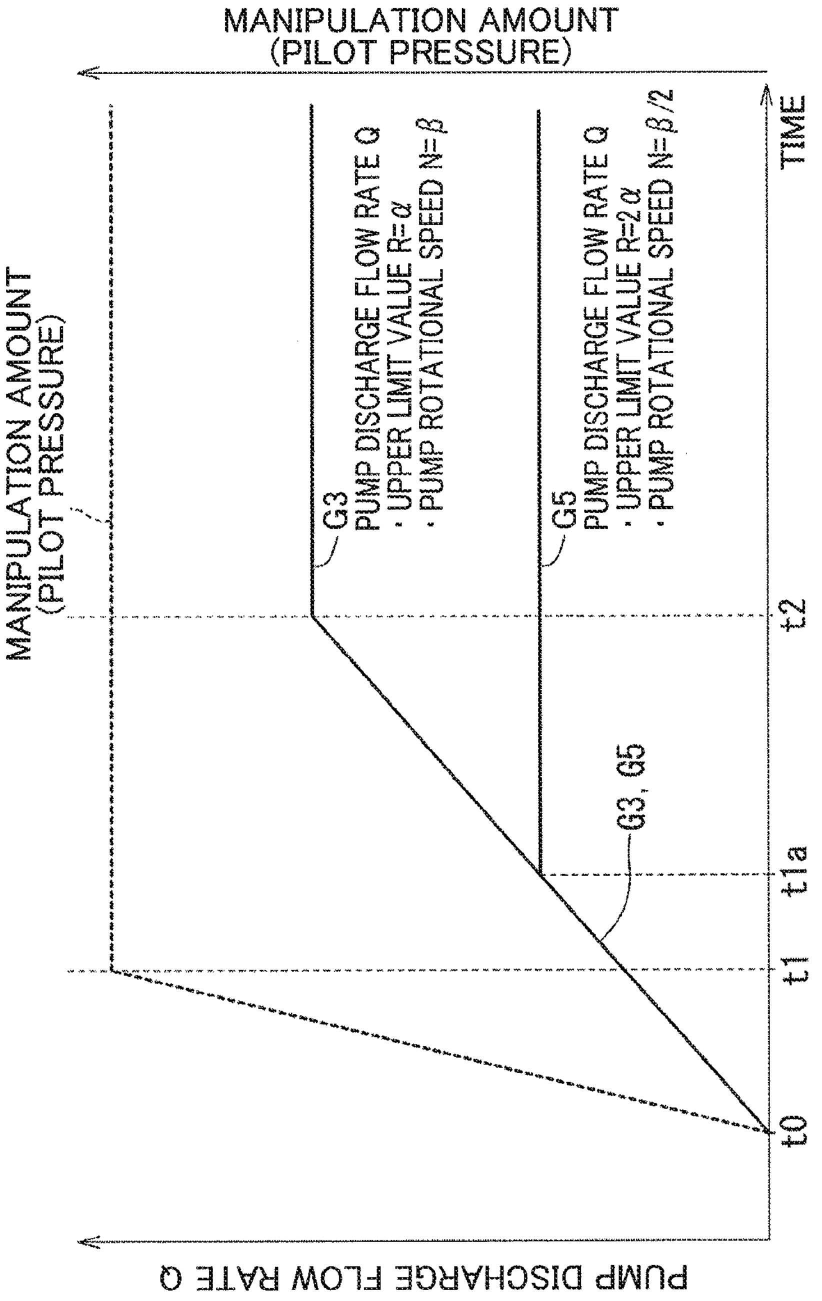
FIG. 7 includes graphs respectively showing a change over a period of time in the manipulation amount about the manipulation part and a change over a period of time in the pump discharge flow rate of the pump with an upper limit value changing on the basis of a rotational speed of the pump.

FIG. 7 includes graphs respectively showing a change over a period of time in the manipulation amount about the manipulation part 31 and a change over a period of time in a pump discharge flow rate of the pump 21. FIG. 7 shows each graph with the upper limit value R changing on the basis of the pump rotational speed N, and shows a relation between the time and the pump discharge flow rate Q for each of the pump rotational speed N indicating "β" (graph G3) and the pump rotational speed N indicating "(β/2)" (graph G5). FIG. 7 further shows a relation between the time and the manipulation amount. The relation between the time and the manipulation amount is the same as the relation in the graphs in each of FIG. 4 and FIG. 5. The graph G3 for the case of "β" of the pump rotational speed N corresponds to "graph G3" shown in FIG. 5. In this example, "β" represents the reference rotational speed Ns. A degree of the upper limit value R, that is, the reference upper limit value Rs, in the case of "β" of the pump rotational speed N is defines as "α". In the case of "(β/2)" of the pump rotational speed N (graph G5), the upper limit value R differs from "α", and specifically, is 2α. As a result, the slope (pump discharge flow rate change amount ΔQ) of the graph in the case of "β" of the pump rotational speed N (graph G3) and the slope (pump discharge flow rate change amount ΔQ) of the graph in the case of "(β/2)" of the pump rotational speed N (graph G5) are equal to each other for a period from time t1 to time t1*a*.

Flowchart

Figure 8:
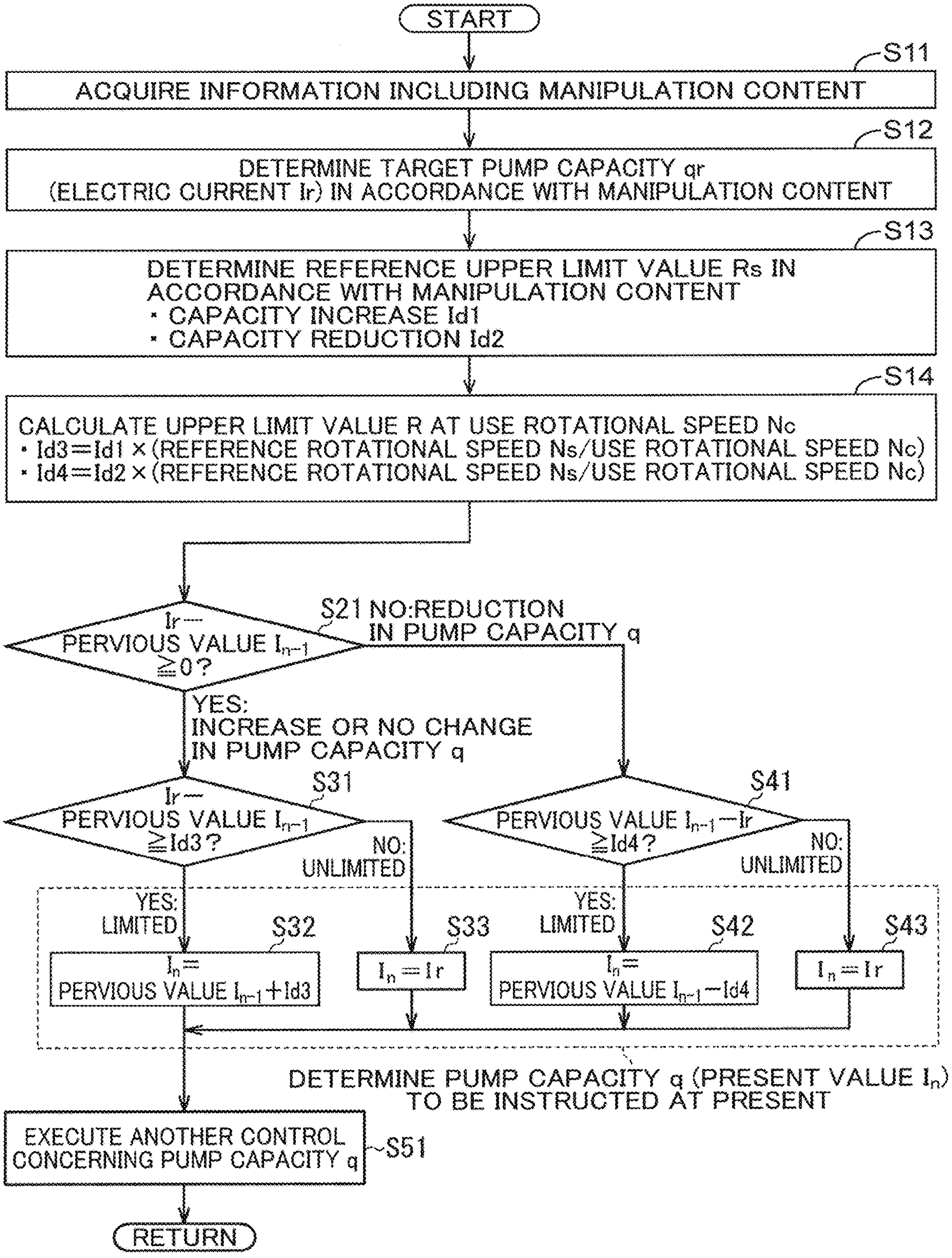
FIG. 8 is a flowchart showing an example of calculation executed by the controller shown in FIG. 2.

A specific example of calculation of a pump capacity q by the controller 40 shown in FIG. 2 will be described with reference to the flowchart in FIG. 8. Hereinafter, steps S11 to S51 in the flowchart will be described with reference to FIG. 8. In this example, a manipulation or predetermined manipulation content to move a specific actuator 25 (e.g., one of the actuators 25 shown in FIG. 2) in a specific direction will be described. Further, described in this example is that a pump capacity instruction indicates an electric current value or a pump capacity instruction electric current, and an upper limit value R indicates an upper limit of a change amount of the electric current value per unit time.

In step S11, the controller 40 (the manipulation content acquisition part 41) acquires or takes a manipulation content of the manipulation part 31. The manipulation content to be acquired may include, for example, a manipulation amount of a manipulation given to the manipulation part 31 by the operator. The controller 40 (the pump rotational speed acquisition part 43) acquires or takes the pump rotational speed N.

In step $12, the controller 40 determines a target pump capacity qr, specifically, a target pump capacity instruction electric current Ir, in accordance with the acquired manipulation content. For instance, the controller 40 calculates the target pump capacity qr according to the manipulation content on the basis of the map in FIG. 3 showing a preset relation between a manipulation content and the target pump capacity qr. In FIG. 8, the target pump capacity instruction electric current Ir is simply referred to as an "electric current Ir."

In step S13, the controller 40 shown in FIG. 2 determines an upper limit value R (reference upper limit value Rs) at a reference rotational speed Ns in accordance with the acquired manipulation amount. For instance, the controller 40 reads a reference upper limit value Rs according to the manipulation content on the basis of a preset relation (map) between a manipulation content and the reference upper limit value Rs. The controller 40 may determine a reference upper limit value Rs for an increase in the pump capacity q, specifically, a reference electric current upper limit value Id1 for the increase, and may determine a reference upper limit value Rs for a reduction in the pump capacity q, specifically, a reference electric current upper limit value Id2 for the reduction. Each of the reference electric current upper limit value Id1 for the increase and the reference electric current upper limit value Id2 for the reduction may be a reference upper limit value of a change amount of an electric current value serving as a pump capacity instruction.

In step 14, the controller 40 calculates an upper limit value R at a use rotational speed Nc. The controller 40 calculates the upper limit value R for an increase in the pump capacity q, specifically, a correction electric current upper limit value Id3 for the increase, and an upper limit value R for a reduction in the pump capacity q, specifically, a correction electric current upper limit value Id4 for the reduction. More specifically, the controller 40 calculates the correction electric current upper limit value Id3 for the increase and the correction electric current upper limit value Id4 for the reduction with the following equations respectively.

Correction electric current upper limit value Id3 for increase=reference electric current upper limit value Id1 for increase x (reference rotational speed Ns/use rotational speed Nc)

$$\text{Correction electric current upper limit value } Id4 \text{ for reduction} = \text{reference electric current upper limit value } Id2 \text{ for reduction} \times (\text{reference rotational speed } Ns/\text{use rotational speed } Nc)$$

In step S21, the controller 40 shown in FIG. 2 determines whether the acquired manipulation content is a manipulation content to increase the pump capacity q or a manipulation content not to change the pump capacity q. Specifically, the controller 40 determines whether a value resulting from subtracting a pump capacity q instructed one control cycle before (a pump capacity q previously instructed) from a present target pump capacity qr is equal to or larger than 0. The value resulting from subtracting the pump capacity q instructed one control cycle before (the pump capacity q previously instructed) from the present target pump capacity qr is referred to as a "target value of the pump capacity change amount Δq". More specifically, the controller 40 determines whether the value resulting from subtracting a pump capacity instruction electric current previously instructed (previous value $I_{n-1}$) from the target pump capacity instruction electric current Ir (sec Step 12) is equal to or larger than 0 (whether "Ir−previous value $I_{n-1} \geq 0$" is satisfied). When the manipulation content indicates a manipulation to increase the pump capacity q or a manipulation not to change the pump capacity q (YES in step S21), the controller 40 executes step S31. When the manipulation content indicates a manipulation to reduce the pump capacity q (NO in step S21), the controller 40 executes step S41.

In step S31, the controller 40 determines whether a target value of a pump capacity change amount Δq is equal to or larger than an upper limit value R, that is, an upper limit value R for an increase. Specifically, the controller 40 determines whether a value resulting from subtracting a pump capacity instruction electric current previously instructed from the target pump capacity instruction electric current Ir is equal to or larger than the correction electric current upper limit value Id3 for the increase (whether "Ir−previous value $I_{n-1} \geq$ Id3" is satisfied).

When the target value of the pump capacity change amount Δq is equal to or larger than the upper limit value R for the increase (YES in step S31), the controller 40 sets a sum of a pump capacity q previously instructed and the upper limit value R to a pump capacity q to be instructed at present (step S32). Specifically, the controller 40 sets a sum of the pump capacity instruction electric current previously instructed (previous value $I_{n-1}$) and the correction electric current upper limit value Id3 for the increase to a pump capacity instruction electric current to be instructed at present (present value $I_n$), that is, $I_n$=previous value $I_{n-1}$+Id3.

When the target value of the pump capacity change amount Δq is smaller than the upper limit value R for the increase (No in step S31), the controller 40 sets the pump capacity q to be instructed at present to the target pump capacity qr (step S33). In this case, the controller 40 avoids limiting the magnitude of the pump capacity change amount Δq by the upper limit value R. Specifically, the controller 40 sets the pump capacity instruction electric current to be instructed at present (present value $I_n$) to the target pump capacity instruction electric current Ir ($I_n$=Ir). The controller 40 executes step S51 after step S32 or step S33.

In step S41, the controller 40 determines whether a magnitude or absolute value of the target value of the pump capacity change amount Δq is equal to or larger than an upper limit value R, that is, an upper limit value R for a reduction. Specifically, the controller 40 determines whether a value resulting from subtracting the target pump capacity instruction electric current Ir from the pump capacity instruction electric current previously instructed (previous value $I_{n-1}$) is equal to or larger than the correction electric current upper limit value Id4 for the reduction, i.e., indicates "previous value $I_{n-1}$−Ir≥Id4". The controller 40 may determine whether an absolute value resulting from subtracting the previous value $I_{n-1}$ from the target pump capacity instruction electric current Ir is equal to or larger than the correction electric current upper limit value Id4 for the reduction (whether "|Ir−previous value $I_{n-1}$|≥Id4" is satisfied).

When the target value of the pump capacity change amount Δq is equal to or larger than the upper limit value R (YES in step 41), the controller 40 sets a value resulting from subtracting the upper limit value R from the pump capacity q previously instructed to the pump capacity q to be instructed at present (S42). Specifically, the controller 40 sets the value resulting from subtracting the correction electric current upper limit value Id4 from the pump capacity instruction electric current previously instructed (previous value $I_{n-1}$) to the pump capacity instruction electric current to be instructed at present (present value $I_n$), that is, $I_n$=previous value $I_{n-1}$−Id4.

When the target value of the pump capacity change amount Δq is not equal to or larger than the upper limit value R (No in step S41), the controller 40 sets the pump capacity q to be instructed at present to the target pump capacity qr (step S43). In this case, the controller 40 avoids limiting the magnitude of the pump capacity change amount Δq by the upper limit value R. Specifically, the controller 40 sets the pump capacity instruction electric current to be instructed at present (present value $I_n$) to the target pump capacity instruction electric current Ir ($I_n$=Ir).

The controller 40 may instruct or output, to the pump capacity regulator 23, the pump capacity q to be instructed at present (specifically, the present value $I_n$), the pump capacity q having been determined in step S32, S33, S42, or S43. The controller 40 may return to step S11 after step $32, S33, S42, or S43. In this case, step S51 may be excluded.

The controller 40 may execute step S51 subsequently to step S42 or step S43. In step S51, the controller 40 may execute another control concerning the pump capacity q and correct the pump capacity q. Specifically, for instance, the controller 40 may execute a control (e.g., P-Q control) of limiting an output of the pump 21. It is noted here that each of the "pump capacity q previously instructed" and the "pump capacity q to be instructed at present" is not a pump capacity q to be corrected in step S51, but is a value determined in step S32, S33, S42, or S43 before execution of step S51. Specifically, each of the "present value $I_n$" and the "previous value $I_{n-1}$" of the pump capacity instruction electric current is not an electric current value to be corrected in step S51, but a value determined in step S32, S33, S42, or S43 before execution of step S51. After step S51, the controller 40 returns to step S11. The controller 40 repeats the sequence of steps S11 to S51.

Advantageous Effects of the Invention According to a First Feature

The hydraulic driving system 1 shown in FIG. 2 provides the following effects. The hydraulic driving system 1 includes the pump 21, the actuator 25, and the controller 40. The pump 21 is rotationally driven by a power source 17 to discharge oil. The pump 21 has a capacity which is changeable. The actuator 25 is activated by a supply of the oil discharged from the pump 21. The controller 40 controls the capacity of the pump 21 in accordance with a manipulation content for the actuator 25.

Configuration 1: The controller 40 changes an upper limit value R of a magnitude of a pump capacity change amount Δq being a change amount of the capacity of the pump 21 per unit time on the basis of a rotational speed of the pump 21 (pump rotational speed N) (see FIG. 6).

In Configuration 1, the controller 40 sets the upper limit value R of the magnitude of the pump capacity change amount Δq in consideration of the pump rotational speed N. For instance, the hydraulic driving system 1 enables setting of the pump capacity change amount Δq to a magnitude on the basis of the pump rotational speed N more suitably than a configuration of setting the upper limit value R without consideration of the pump rotational speed N. The hydraulic driving system 1 accordingly enables setting of a flow rate of oil to be supplied from the pump 21 to the actuator 25 to an appropriate value based on the pump rotational speed N. As a result, the hydraulic driving system 1 enables setting of such an upper limit value R as to prevent a sudden change in a pump discharge flow rate Q, and further enables setting of such an upper limit value R as to prevent an excessive delay in a change in the pump discharge flow rate Q in relation to a change in a manipulation content (e.g., a manipulation amount).

Advantageous Effects of the Invention According to a Second Feature

Configuration 2: The controller 40 sets the upper limit value R to the first upper limit value R1 when the pump rotational speed N is the first rotational speed N1, and sets the upper limit value R to the second upper limit value R2 which is smaller than the first upper limit value R1 when the pump rotational speed N is the second rotational speed N2 which is higher than the first rotational speed N1. Specifically, the controller 40 sets the magnitude of the pump capacity change amount Δq, that is, a magnitude of the pump capacity change amount Δq limited by the upper limit value R, to the first pump capacity change amount Δq1 when the pump rotational speed N is the first rotational speed N1. The controller 40 further sets the magnitude of the pump capacity change amount Δq, that is, a magnitude of the pump capacity change amount Δq limited by the upper limit value R, to the second pump capacity change amount Δq2 when the pump rotational speed N is the second rotational speed N2 which is higher than the first rotational speed N1. The controller 40 sets the upper limit value R so that the second pump capacity change amount Δq2 is smaller than the first pump capacity change amount Δq1.

Configuration 2 described above provides the following advantageous effects. Under the same pump capacity change amount Δq, as the pump rotational speed N is higher, the pump discharge flow rate change amount ΔQ increases (sec FIG. 5) and the pump discharge flow rate Q is likely to suddenly change. In this regard, Configuration 2 allows the second pump capacity change amount Δq2 to be smaller than the first pump capacity change amount Δql when the pump rotational speed N is the second rotational speed N2 which is higher than the first rotational speed N1 (see FIG. 6). The hydraulic driving system 1 thus achieves prevention of a sudden change in the pump discharge flow rate Q when the pump rotational speed N is the second rotational speed N2 being a high pump rotational speed. As a result, for instance, the hydraulic driving system 1 avoids an unpreferable movement of the actuator 25, such as a shock, and prevents cavitation from occurring at the actuator 25 and therearound.

Under the same pump capacity change amount Δq, as the pump rotational speed N is lower, the pump discharge flow rate change amount ΔQ reduces and a change in the pump discharge flow rate Q is likely to delay in relation to a change in the manipulation content (e.g., a manipulation amount) (see FIG. 5). In this regard, Configuration 2 allows the first pump capacity change amount Δql to be larger than the second pump capacity change amount Δq2 when the pump rotational speed N is the first rotational speed N1 which is lower than the second rotational speed N2 (see FIG. 6). The hydraulic driving system 1 thus achieves prevention of an excessive delay in a change in the pump discharge flow rate Q in relation to a change in the manipulation content (e.g., the manipulation amount) when the pump rotational speed N is the first rotational speed N1 being a low pump rotational speed. As a result, for instance, the hydraulic driving system 1 reliably ensures responsiveness of an operation of the actuator 25 in relation to a change in the manipulation content (e.g., a manipulation amount). The hydraulic driving system 1 having Configuration 2 accordingly enables setting of the flow rate of the oil to be supplied from the pump 21 to the actuator 25 to a more appropriate value based on the pump rotational speed N.

Advantageous Effects of the Invention According to a Third Feature

Configuration 3: The controller 40 sets the upper limit value R in such a manner that the upper limit value R decreases as the pump rotational speed N increases.

Configuration 3 described above achieves further reliable exertion of the advantageous effects by Configuration 2.

Advantageous Effects of the Invention According to a Fourth Feature

Configuration 4: The controller 40 sets the upper limit value R so that a change amount in a discharge flow rate of the pump 21 per unit time (pump discharge flow rate change amount ΔQ) is fixed when the pump rotational speed N falls within a predetermined range. Configuration 4 allows the pump discharge flow rate change amount ΔQ to be fixed regardless of the pump rotational speed N (see FIG. 6). The configuration more reliably ensures prevention of a sudden change in the pump discharge flow rate Q, and more reliably ensures prevention of an excessive delay in a change in the pump discharge flow rate Q in relation to a change in the manipulation content (e.g., the manipulation amount). The hydraulic driving system 1 accordingly enables setting of a more appropriate pump capacity change amount Δq based on the pump rotational speed N. As a result, the hydraulic driving system 1 enables setting of the flow rate of the oil to be supplied from the pump 21 to the actuator 25 to a more appropriate value based on the pump rotational speed N.

Advantageous Effects of the Invention According to a Fifth Feature

Configuration 5: The power source 17 and the pump 21 are mounted to the working machine 10. The actuator 25 operates the working machine 10.

Configuration 5 enables the working machine 10 including the power source 17, the pump 21, and the actuator 25 to exert the advantageous effects of setting the flow rate of the oil to be supplied from the pump 21 to the actuator 25 to an appropriate value based on the pump rotational speed N.

Modifications

The embodiment described above may be modified in various ways. For example, the number of constituent elements in the embodiments including the modifications may be changed, and one or more of the structural elements are excludable. For instance, the modifications of the embodiments may be combined with each other in various ways. The constituent elements may be, for example, fixed to or connected to each other in a direct way or an indirect way. For instance, the connection between or among the constituent elements shown in FIG. 2 may be changed. For example, the inclusion relation of the constituent elements may be variously changed. For instance, a constituent element under a lower concept described to be included in a constituent element under a higher concept may not be included in the constituent element under the higher concept. The constituent elements are described as members different from one another or a part of the structure, but may, for example, cover a single member or a part of a specific member. For instance, the constituent element described as a single member or a part of a specific member (e.g., the controller 40) may cover a plurality of members or parts different from one another. For example, the parameters, such as set values, thresholds, and ranges, may be preset in the controller 40, or may be directly set through a manipulation by an operator. For example, the parameters may be calculated by the controller 40 on the basis of information manually set by the operator, or calculated by the controller 40 on the basis of information detected by a sensor. For instance, the parameters may not be changed, may be changed through, for example, manipulation, or may be automatically changed by the controller 40 under a certain condition. For instance, the order of the steps in the flowchart shown in FIG. 8 may be changed, and a part of the steps may not be executed. Each constituent element may have, for example, only a part of features, such as operative function, an arrangement, a shape, and movement or operation.

DESCRIPTION FOR REFERENCE SIGNS

1 hydraulic driving system
10 working machine
17 power source
21 pump
25 actuator
40 controller
N pump rotational speed (rotational speed of the pump 21)
N1 first rotational speed
N2 second rotational speed
R upper limit value
Δq pump capacity change amount
Δq1 first pump capacity change amount
Δq2 second pump capacity change amount

The invention claimed is:

1. A hydraulic driving system, comprising:

a pump that is rotationally driven by a power source to discharge oil and has a capacity which is changeable;

an actuator that is activated by a supply of the oil discharged from the pump; and a controller that controls the capacity of the pump in accordance with a manipulation content for the actuator, wherein the controller changes, on the basis of a rotational speed of the pump, an upper limit value of a magnitude of a pump capacity change amount being a change amount of the capacity of the pump per unit time wherein the controller executes:

setting the upper limit value to a first upper limit value when a rotational speed of the pump is a first rotational speed; and setting the upper limit value to a second upper limit value which is smaller than the first upper limit value when the rotational speed of the pump is a second rotational speed which is higher than the first rotational speed, wherein the controller sets the upper limit value in such a manner that the upper limit value decreases as the rotational speed of the pump increases, wherein the controller sets the upper limit value so that a change amount in a discharge flow rate of the pump per unit time is fixed when the rotational speed of the pump falls within a predetermined range, and wherein the controller:

determines a reference upper limit value being the upper limit value at a reference rotational speed as a reference of the pump rotational speed, calculates a rotational speed ratio being a ratio between the reference rotational speed and a use rotational speed which is a present pump rotational speed, and calculates the upper limit value at the use rotational speed on the basis of the reference upper limit value and the rotational speed ratio.

2. The hydraulic driving system according to claim 1, wherein the power source and the pump are mounted to a working machine, and the actuator operates the working machine.

* * * * *